(12) United States Patent
Saragih et al.

(10) Patent No.: US 12,056,824 B2
(45) Date of Patent: Aug. 6, 2024

(54) SIMULATED CONTROL FOR 3-DIMENSIONAL HUMAN POSES IN VIRTUAL REALITY ENVIRONMENTS

(71) Applicant: Meta Platforms Technologies, LLC, Menlo Park, CA (US)

(72) Inventors: Jason Saragih, Pittsburgh, PA (US); Shih-En Wei, Pittsburgh, PA (US); Tomas Simon Kreuz, Pittsburgh, PA (US); Kris Makoto Kitani, Pittsburgh, PA (US); Ye Yuan, Pittsburgh, PA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 9 days.

(21) Appl. No.: 17/556,429

(22) Filed: Dec. 20, 2021

(65) Prior Publication Data

US 2022/0207831 A1     Jun. 30, 2022

Related U.S. Application Data

(60) Provisional application No. 63/130,005, filed on Dec. 23, 2020.

(51) Int. Cl.
*G06T 19/00* (2011.01)
*G06T 15/10* (2011.01)
(Continued)

(52) U.S. Cl.
CPC .............. *G06T 19/00* (2013.01); *G06T 15/10* (2013.01); *G06V 40/103* (2022.01); *G06V 40/23* (2022.01)

(58) Field of Classification Search
CPC ....... G06T 19/00; G06T 15/10; G06V 40/103; G06V 40/23
See application file for complete search history.

(56) References Cited

U.S. PATENT DOCUMENTS 8,531,464 B1 *   9/2013  Cohen Bengio ........ G06T 13/40
                                                                    345/473
11,055,891 B1 *  7/2021  Ofek ....................... G06T 13/40
(Continued)

OTHER PUBLICATIONS

Amberg B., et al., "Optimal Step Nonrigid ICP Algorithms for Surface Registration," In 2007 IEEE Conference on Computer Vision and Pattern Recognition (CVPR), 2007, pp. 1-8.
(Continued)

*Primary Examiner* — Abderrahim Merouan
(74) *Attorney, Agent, or Firm* — McDermott Will & Emery LLP

(57) ABSTRACT

A method for simulating a solid body animation of a subject includes retrieving a first frame that includes a body image of a subject. The method also includes selecting, from the first frame, multiple key points within the body image of the subject that define a hull of a body part and multiple joint points that define a joint between two body parts, identifying a geometry, a speed, and a mass of the body part to include in a dynamic model of the subject, based on the key points and the joint points, determining, based on the dynamic model of the subject, a pose of the subject in a second frame after the first frame in a video stream, and providing the video stream to an immersive reality application running on a client device.

20 Claims, 11 Drawing Sheets

(51) Int. Cl.
G06V 40/10 (2022.01)
G06V 40/20 (2022.01)

(56) References Cited

U.S. PATENT DOCUMENTS

2012/0328158 A1* 12/2012 Lefevre .................... G06T 7/20
                                                            382/103
2020/0364901 A1* 11/2020 Choudhuri ............ G06T 19/006
2022/0207831 A1*  6/2022 Saragih .................. G06T 13/40

OTHER PUBLICATIONS

Anguelov D., et al., "Scape: Shape Completion and Animation of People," In ACM SIGGRAPH 2005 Papers, 2005, pp. 408-416.

Arnab A., et al., "Exploiting Temporal Context for 3D Human Pose Estimation in the Wild," In Proceedings of the IEEE Conference on Computer Vision and Pattern Recognition, 2019, pp. 3395-3404.

Bergamin K., et al., "DReCon: Data-Driven Responsive Control of Physics-Based Characters," ACM Transactions on Graphics (TOG), Nov. 2019, vol. 38, No. 6, pp. 1-11.

Bogo F., et al., "Keep It SMPL: Automatic Estimation of 3D Human Pose and Shape from a Single Image," In European Conference on Computer Vision (ECCV), Springer, 2016, pp. 561-578.

Brubaker M.A., et al., "Estimating Contact Dynamics," In 2009 IEEE 12th International Conference on Computer Vision (ICCV), 2009, pp. 2389-2396.

Cao Z., et al., "Realtime Multi-Person 2D Pose Estimation Using Part Affinity Fields," In Proceedings of the IEEE Conference on Computer Vision and Pattern Recognition (CVPR), 2017, pp. 7291-7299.

Dabral R., et al., "Learning 3D Human Pose from Structure and Motion," In Proceedings of the European Conference on Computer Vision (ECCV), 2018, pp. 668-683.

Erwin Coumans: "Bullet Physics Engine," Open Source Software, 2010, 1(3):84, Retrieved from the Internet: URL: http://bulletphysics.org, 40 pages.

Guler R.A., et al., "HoloPose: Holistic 3D Human Reconstruction In-The-Wild," In Proceedings of the IEEE Conference on Computer Vision and Pattern Recognition (CVPR), 2019, pp. 10884-10894.

He K., et al., "Deep Residual Learning for Image Recognition," In Proceedings of The IEEE Conference on Computer Vision and Pattern Recognition, 2016, pp. 770-778.

Ho J., et al., "Generative Adversarial Imitation Learning," In Advances in Neural Information Processing Systems (NIPS), 2016, 9 pages.

Hossain M.R.I., et al., "Exploiting Temporal Information for 3D Human Pose Estimation," In Proceedings of the European Conference on Computer Vision (ECCV), 2018, pp. 68-84.

Hoyet L., et al., "Push it Real: Perceiving Causality in Virtual Interactions," ACM Transactions on Graphics (TOG), Jul. 2012, vol. 31, No. 4, pp. 1-9.

Huang Y., et al., "Towards Accurate Marker-Less Human Shape and Pose Estimation over Time," In 2017 International Conference on 3D vision (3DV), IEEE, 2017, pp. 421-430.

Ionescu C., et al., "Human3.6M: Large Scale Datasets and Predictive Methods for 3D Human Sensing in Natural Environments," IEEE Transactions on Pattern Analysis and Machine Intelligence, 2013, vol. 36, No. 7, pp. 1325-1339.

Isogawa M., et al., "Optical Non-Line-of-Sight Physics-Based 3D Human Pose Estimation," In Proceedings of the IEEE/CVF Conference on Computer Vision and Pattern Recognition (CVPR), 2020, pp. 7013-7022.

Kanazawa A., et al., "End-to-end Recovery of Human Shape and Pose," Computer Vision and Pattern Recognition (CVPR), 2018, pp. 7122-7131.

Kanazawa A., et al., "Learning 3D Human Dynamics from Video," In Proceedings of the IEEE Conference on Computer Vision and Pattern Recognition (CVPR), 2019, pp. 5614-5623.

Kavan L., et al., "Skinning with Dual Quaternions," In Proceedings of the 2007 Symposium on Interactive 3D Graphics and Games, 2007, pp. 39-46.

Kingma D.P., et al., "ADAM: A Method for Stochastic Optimization," ArXir:1412.6980v1, Dec. 22, 2014, 9 pages.

Kocabas M., et al., "VIBE: Video Inference for Human Body Pose and Shape Estimation," In Proceedings of the IEEE/CVF Conference on Computer Vision and Pattern Recognition (CVPR), 2020, pp. 5253-5263.

Kolotouros N., et al., "Learning to Reconstruct 3D Human Pose and Shape via Model-Fitting in the Loop," In Proceedings of the IEEE International Conference on Computer Vision (CCV), 2019, pp. 2252-2261.

Lassner C., et al., "Unite the People: Closing the Loop Between 3D and 2D Human Representations," In Proceedings of the IEEE Computer Vision and Pattern Recognition (CVPR), Jan. 10, 2017, pp. 6050-6059.

Li Z., et al., "Estimating 3D Motion and Forces of Person-Object Interactions from Monocular Video," In Proceedings of the IEEE Conference on Computer Vision and Pattern Recognition (CVPR), 2019, pp. 8640-8649.

Liu L., et al., "Learning Basketball Dribbling Skills using Trajectory Optimization and Deep Reinforcement Learning," ACM Transactions on Graphics (TOG), 2018, vol. 37, No. 4, pp. 1-14.

Liu L., et al., "Learning to Schedule Control Fragments for Physics-Based Characters Using Deep Q-Learning," ACM Transactions on Graphics (TOG), Jun. 2017, vol. 36, No. 3, Article 29, pp. 1-14.

Loper M., et al., "SMPL: A Skinned Multi-Person Linear Model," ACM Transactions on Graphics, 2015, vol. 34 (6), pp. 248:1-248:16.

Luo Z., et al., "3D Human Motion Estimation via Motion Compression and Refinement," Proceedings of the Asian Conference on Computer Vision (ACCV), 2020, pp. 1-17.

Mehta D., et al., "Single-Shot Multi-Person 3D Pose Estimation from Monocular RGB," In 2018 International Conference on 3D Vision (3DV), IEEE, 2018, pp. 120-130.

Mehta D., et al., "VNect: Real-Time 3D Human Pose Estimation with a Single RGB Camera," ACM Transactions on Graphics (TOG), 2017, vol. 36, pp. 1-14.

Merel J., et al., "Catch & Carry: Reusable Neural Controllers for Vision-Guided Whole-Body Tasks," ACM Transactions on Graphics (TOG), Jul. 2020, vol. 39, No. 4, Article 39, pp. 1-14.

Merel J., et al., "Hierarchical Visuomotor Control of Humanoids," arXiv preprint arXiv:1811.09656, 2018, pp. 1-18.

Merel J., et al., "Learning Human Behaviors from Motion Capture by Adversarial Imitation," arXiv preprint arXiv:1707.02201, 2017, pp. 1-12.

Merel J., et al., "Neural Probabilistic Motor Primitives for Humanoid Control," arXiv preprint arXiv:1811.11711, 2018, pp. 1-14.

Moon G., et al., "I2L-MeshNet: Image-to-Lixel Prediction Network for Accurate 3D Human Pose and Mesh Estimation from a Single RGB Image," In European Conference on Computer Vision (ECCV), 2020, pp. 1-23.

Omranl, et al., "Neural Body Fitting: Unifying Deep Learning and Model-Based Human Pose and Shape Estimation," arXiv: 18n8.05942v1 [cs.CV], Aug. 17, 2018, pp. 484-494.

Park S., et al., "Learning Predict-And-Simulate Policies from Unorganized Human Motion Data," ACM Transactions on Graphics (TOG), 2019, vol. 38, No. 6, pp. 1-11.

Pavlakos G., et al., "Expressive Body Capture: 3D Hands, Face, and Body from a Single Image," In Proceedings of the IEEE Conference on Computer Vision and Pattern Recognition (CVPR), 2019, pp. 10975-10985.

Pavlakos G., et al., "Learning to Estimate 3D Human Pose and Shape from a Single Color Image," In Proceedings of the IEEE Conference on Computer Vision and Pattern Recognition (CVPR), 2018, pp. 459-468.

Pavllo D., et al., "3D Human Pose Estimation in Video with Temporal Convolutions and Semi-Supervised Training," In Proceedings of Computer Vision and Pattern Recognition (CVPR), 2019, pp. 7753-7762.

(56) References Cited

OTHER PUBLICATIONS

Peng X.B., et al., "Deep Mimic: Example-Guided Deep Reinforcement Learning of Physics-Based Character Skills," ACM Transactions on Graphics, Aug. 2018, vol. 37 (4), Article 143, pp. 143:1-143:18.

Peng X.B., et al., "SFV: Reinforcement Learning of Physical Skills from Videos," ACM Transactions on Graphics, Nov. 2018, vol. 37, No. 6, Article 178, 17 pages, Retrieved from the Internet: URL: https://doi.org/10.1145/3272127.3275014.

Peng X.B., et al., "Learning Locomotion Skills Using DeepRL: Does the Choice of Action Space Matter?," In Proceedings of the ACM SIGGRAPH/Eurographics Symposium on Computer Animation, 2017, pp. 1-13.

Peng X.B., et al., "MCP: Learning Composable Hierarchical Control with Multiplicative Compositional Policies," In Advances in Neural Information Processing Systems (NIPS), 2019, pp. 3681-3692.

Reitsma P.S.A., et al., "Perceptual Metrics for Character Animation: Sensitivity to Errors in Ballistic Motion," In ACM SIGGRAPH 2003 Papers, 2003, pp. 537-542.

Rempe D., et al., "Contact and Human Dynamics from Monocular Video," In Proceedings of the European Conference on Computer Vision (ECCV), 2020, pp. 1-27.

Schulman J., et al., "High-Dimensional Continuous Control Using Generalized Advantage Estimation," arXiv preprint arXiv:1506.02438, 2015, pp. 1-14.

Schulman J., et al., "Proximal Policy Optimization Algorithms," Machine Learning, arXiv preprint arXiv:1707.06347, 2017, pp. 1-12.

Shimada S., et al., "Physcap: Physically Plausible Monocular 3D Motion Capture in Real Time," ACM Transactions on Graphics (TOG), Dec. 2020, vol. 39, No. 6, 16 pages.

Song J., et al., "Human Body Model Fitting by Learned Gradient Descent," In Proceedings of the European Conference on Computer Vision (ECCV), 2020, pp. 1-17.

Sun Y., et al., "Human Mesh Recovery from Monocular Images via a Skeleton-Disentangled Representation," In Proceedings of the IEEE International Conference on Computer Vision (CCV), 2019, pp. 5349-5358.

Tan J.K.V., et al., "Indirect Deep Structured Learning for 3D Human Body Shape and Pose Prediction," British Machine Vision Conference (BMVC), 2017, pp. 1-11.

Todorov E., et al., "MuJoCo: A Physics Engine for Model-Based Control," In 2012 IEEE/RSJ International Conference on Intelligent Robots and Systems (IRS), 2012, pp. 5026-5033.

Tung H., et al., "Self-supervised Learning of Motion Capture," 31st Conference on Neural Information Processing Systems (NIPS 2017), arXiv: 1712.01337v1 [cs.CV], Dec. 4, 2013, Long Beach, CA, pp. 1-11.

Vaswani A., et al., "Attention Is All You Need," Advances in Neural Information Processing Systems, December (NIPS), 2017, pp. 5998-6008.

Vondrak M., et al., "Video-Based 3D Motion Capture Through Biped Control," ACM Transactions On Graphics (TOG), 2012, vol. 31, No. 4, pp. 1-12.

Wang Z., et al., "Robust Imitation of Diverse Behaviors," In Advances in Neural Information Processing Systems (NIPS), 2017, pp. 5320-5329.

Wei S.E., et al., "Convolutional Pose Machines," The Conference on Computer Vision and Pattern Recognition (CVPR), 2016, pp. 4724-4732.

Wei X., et al., "VideoMocap: Modeling Physically Realistic Human Motion from Monocular Video Sequences," In ACM SIGGRAPH 2010 papers, 2010, vol. 29, No. 4, Article 42, pp. 1-10.

Won J., et al., "A Scalable Approach to Control Diverse Behaviors for Physically Simulated Characters," ACM Transactions on Graphics (TOG), 2020, vol. 39, No. 4, Article 33, pp. 1-12.

Xiang D., et al., "Monocular Total Capture: Posing Face, Body, and Hands in the Wild," In Proceedings of the IEEE Conference on Computer Vision and Pattern Recognition (CVPR), 2019, pp. 10965-10974.

Yuan Y., et al., "3D Ego-Pose Estimation via Imitation Learning," Proceedings of European Conference on Computer Vision (ECCV), 2018, pp. 1-16.

Yuan Y., et al., "Ego-Pose Estimation and Forecasting as Real-Time PD Control," International Conference on Computer Vision (ICCV), 2019, pp. 10082-10092.

Yuan Y., et al., "Residual Force Control for Agile Human Behavior Imitation and Extended Motion Synthesis," In Advances in Neural Information Processing Systems (NIPS), 2020, pp. 1-12.

Yuan Y., et al., "SimPoE: Simulated Character Control for 3D Human Pose Estimation," Proceedings of the IEEE/CVF Conference on Computer Vision and Pattern Recognition (CVPR), 2021, 6 pages.

Zell P., et al., "Joint 3D Human Motion Capture and Physical Analysis from Monocular Videos," In Proceedings of the IEEE Conference on Computer Vision and Pattern Recognition Workshops(CVPR), 2017, pp. 17-26.

Gong W., et al., "Human Pose Estimation from Monocular Images: A Comprehensive Survey," Sensors, Nov. 25, 2016, vol. 16, No. 12, pp. 1-39.

EPO/ISA—International Search Report and Written Opinion for International Application No. PCT/US2021/064860, mailed Apr. 4, 2022, 8 pages.

Makris A., et al., "Robust 3D Human Pose Estimation Guided by Filtered Subsets of Body Keypoints," 16th International Conference On Machine Vision Applications (MVA), May 27, 2019, pp. 1-6.

* cited by examiner

SIMULATED CONTROL FOR 3-DIMENSIONAL HUMAN POSES IN VIRTUAL REALITY ENVIRONMENTS

CROSS-REFERENCE TO RELATED APPLICATIONS

The present disclosure is related and claims priority under 35 U.S.C. § 119(e) to US Provisional Application No. 63/130,005, filed on Dec. 23, 2020, to Saragih, et al., entitled SIMULATED CHARACTER CONTROL FOR 3-DIMENSIONAL HUMAN POSE ESTIMATION, the contents of which are hereby incorporated by reference, in their entirety, for all purposes.

BACKGROUND

Field

The present disclosure is related generally to the field of generating three-dimensional computer models of subjects in a video capture. More specifically, the present disclosure is related to generate three-dimensional computer models of bodily human poses for use in virtual reality and augmented reality (VR/AR) applications.

Related Art

Animatable photorealistic digital humans are a key component for enabling social telepresence, with the potential to open up a new way for people to connect while unconstrained to space and time. Current methods first estimate kinematic motion and then use physics-based trajectory optimization to optimize the forces to induce the kinematic motion. Although they can generate physically-grounded motion, there are several drawbacks of trajectory optimization-based approaches. First, trajectory optimization entails solving a highly-complex optimization problem at test time. This can be computationally intensive and requires the batch processing of a temporal window or even the entire motion sequence, causing high latency in pose predictions and making it unsuitable for inter-active real-time applications. Second, trajectory optimization requires simple and differentiable physics models to make optimization tractable, which can lead to high approximation errors compared to advanced and non-differentiable physics simulators.

Figure 1:
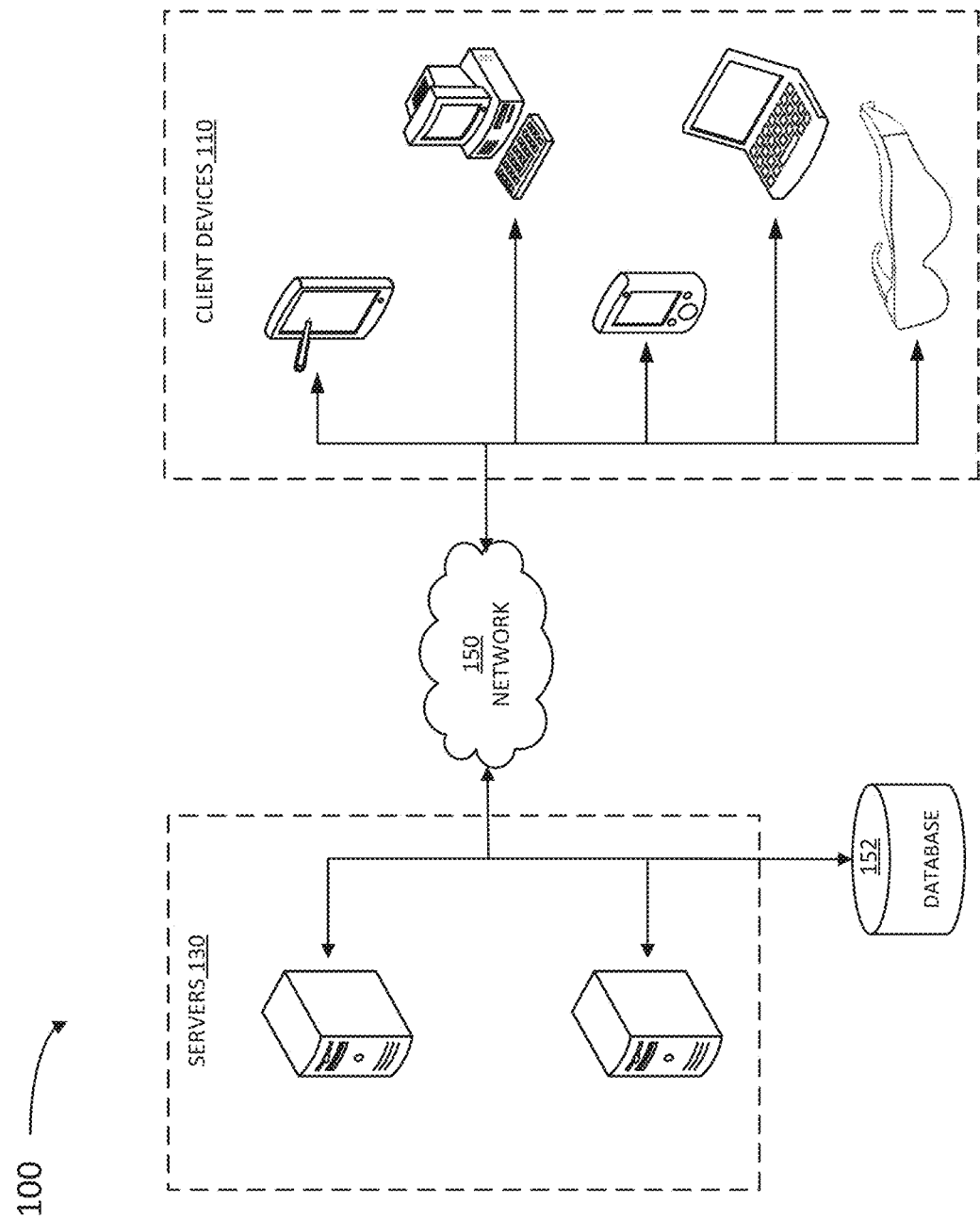
FIG. 1 illustrates an example architecture suitable for providing a real-time, clothed subject animation in a virtual reality environment, according to some embodiments.

In the figures, elements having the same or similar label share the same or similar features, unless expressly stated otherwise.

SUMMARY

In a first embodiment, a computer-implemented method includes retrieving a first frame that includes a body image of a subject, and selecting, from the first frame, multiple key points within the body image of the subject that define a hull of a body part and multiple joint points that define a joint between two body parts. The computer-implemented method also includes identifying a geometry, a speed, and a mass of the body part to include in a dynamic model of the subject, based on the key points and the joint points, determining, based on the dynamic model of the subject, a pose of the subject in a second frame after the first frame in a video stream, and providing the video stream to an immersive reality application running on a client device.

In a second embodiment, system includes a memory storing multiple instructions and one or more processors configured to execute the instructions to cause the system to perform operations. The operations include to retrieve a first frame that includes a body image of a subject, to select, from the first frame, multiple key points within the body image of the subject that define a hull of a body part and multiple joint points that define a joint between two body parts, to identify a geometry, a speed, and a mass of the body part to include in a dynamic model of the subject, based on the key points and the joint points, to determine, based on the dynamic model of the subject, a pose of the subject in a second frame after the first frame in a video stream, and to provide the video stream to an immersive reality application running on a client device along a selected view point of the subject based on the immersive reality application.

In a third embodiment, a computer-implemented method includes retrieving multiple frames from a subject in a video stream and, for a first frame, selecting multiple key points within a body of the subject that define a hull of a body part and multiple joint points that define a joint between two body parts. The computer-implemented method also includes generating a next position for each joint point and each key point based on a dynamic model of the subject and an action that causes the subject to move and determining a loss value indicative of a difference between the next position for each joint point and each key point and a ground truth position for each key point and each joint point extracted from a second frame after the first frame in the video stream. The computer-implemented method also includes updating the dynamic model of the subject based on the loss value, and storing the dynamic model of the subject in a memory circuit.

In yet other embodiments, a system includes a first means for storing instructions and a second means for executing the instructions to cause the system to perform a method. The method includes retrieving a first frame that includes a body image of a subject, selecting, from the first frame, multiple key points within the body image of the subject that define a hull of a body part and multiple joint points that define a joint between two body parts, identifying a geometry, a speed, and a mass of the body part to include in a dynamic model of the subject, based on the key points and the joint points, determining, based on the dynamic model of the subject, a pose of the subject in a second frame after the first frame in a video stream, and providing the video stream to an immersive reality application running on a client device.

In another embodiment, a non-transitory, computer-readable medium stores instructions which, when executed by a computer processor, cause a computer to perform a method. The method includes retrieving a first frame that includes a body image of a subject, selecting, from the first frame, multiple key points within the body image of the subject that define a hull of a body part and multiple joint points that define a joint between two body parts, identifying a geometry, a speed, and a mass of the body part to include in a dynamic model of the subject, based on the key points and the joint points, determining, based on the dynamic model of the subject, a pose of the subject in a second frame after the first frame in a video stream, and providing the video stream to an immersive reality application running on a client device.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Real-time rendering and animation of dynamic representations of humans is one of the cornerstones for games, movies, and VR telepresence applications. Accurate estimation of 3D human motion from monocular video requires modeling both kinematics (body motion without physical forces) and dynamics (motion with physical forces). To demonstrate this, embodiments as disclosed herein include simulation-based approach for 3D human pose estimation, which integrates image-based kinematic inference and physics-based dynamics modeling. Embodiments as disclosed herein include teaching a policy that takes as input the current-frame pose estimate and the next image frame to control a physically-simulated character to output the next-frame pose estimate. The policy contains a learnable kinematic pose refinement unit that uses 2D keypoints to iteratively refine its kinematic pose estimate of the next frame. Based on this refined kinematic pose, the policy learns to compute dynamics-based control (e.g., joint torques) of the character to advance the current-frame pose estimate to the pose estimate of the next frame. Accordingly, some embodiments couple the kinematic pose refinement unit with the dynamics-based control generation unit, which are learned jointly with reinforcement learning to achieve accurate and physically-plausible pose estimation. Furthermore, some embodiments include a meta-control mechanism, which dynamically adjusts the character's dynamics parameters based on the character state to attain more accurate pose estimates. Results on large-scale motion datasets demonstrate that the disclosed embodiments enhance pose accuracy while ensuring physical plausibility.

To address these technical problems arising in the field of computer networks, computer simulations, and immersive reality applications, embodiments as disclosed herein include retrieving a first frame that includes a body image of a subject and selecting, from the first frame, multiple key points within the body image of the subject that define a hull of a body part and multiple joint points that define a joint between two body parts. The method may also include identifying a geometry, a speed, and a mass of the body part to include in a dynamic model of the subject, based on the key points and the joint points, determining, based on the dynamic model of the subject, a pose of the subject in a second frame after the first frame in a video stream, and providing the video stream to an immersive reality application running on a client device.

Some embodiments include determining a gradient factor to associate the pose of the subject with a transition dynamics rule, based on a previous pose of the subject, a previous action feature, and an action policy in the dynamic model of the subject. Some embodiments include determining an action that causes the subject to move based on the geometry, the speed, and the mass of the body part. Some embodiments can determine a confidence level for the multiple key points; and determining a loss value comprises factoring the confidence level for each of the key points in the loss value.

Example System Architecture

FIG. 1 illustrates an example architecture 100 suitable for accessing a model training engine, according to some embodiments. Architecture 100 includes servers 130 communicatively coupled with client devices 110 and at least one database 152 over a network 150. One of the many servers 130 is configured to host a memory including instructions which, when executed by a processor, cause the server 130 to perform at least some of the steps in methods as disclosed herein. In some embodiments, the processor is configured to control a graphical user interface (GUI) for the user of one of client devices 110 accessing the model training engine. For purposes of load balancing, multiple servers 130 can host memories including instructions to one or more processors, and multiple servers 130 can host a history log and a database 152 including multiple training archives used for the model training engine. Moreover, in some embodiments, multiple users of client devices 110 may access the same model training engine to run one or more machine learning models. In some embodiments, a single user with a single client device 110 may train multiple machine learning models running in parallel in one or more servers 130. Accordingly, client devices 110 may communicate with each other via network 150 and through access to one or more servers 130 and resources located therein.

Servers 130 may include any device having an appropriate processor, memory, and communications capability for hosting the model training engine including multiple tools associated with it. The model training engine may be accessible by various clients 110 over network 150. Client devices 110 can be, for example, desktop computers, mobile computers, tablet computers (e.g., including e-book readers), mobile devices (e.g., a smartphone or PDA), or any other device having appropriate processor, memory, and communications capabilities for accessing the model training engine on one or more of servers 130. In some embodiments, a client device 110 may include a virtual reality (VR), or augmented reality (AR) headset. Accordingly, an application installed in the headset may use a 3D rendering model to create an immersive reality environment. Network 150 can include, for example, any one or more of a local area tool (LAN), a wide area tool (WAN), the Internet, and the like. Further, network 150 can include, but is not limited to, any one or more of the following tool topologies, including a bus network, a star network, a ring network, a mesh network, a star-bus network, tree or hierarchical network, and the like.

Figure 2:
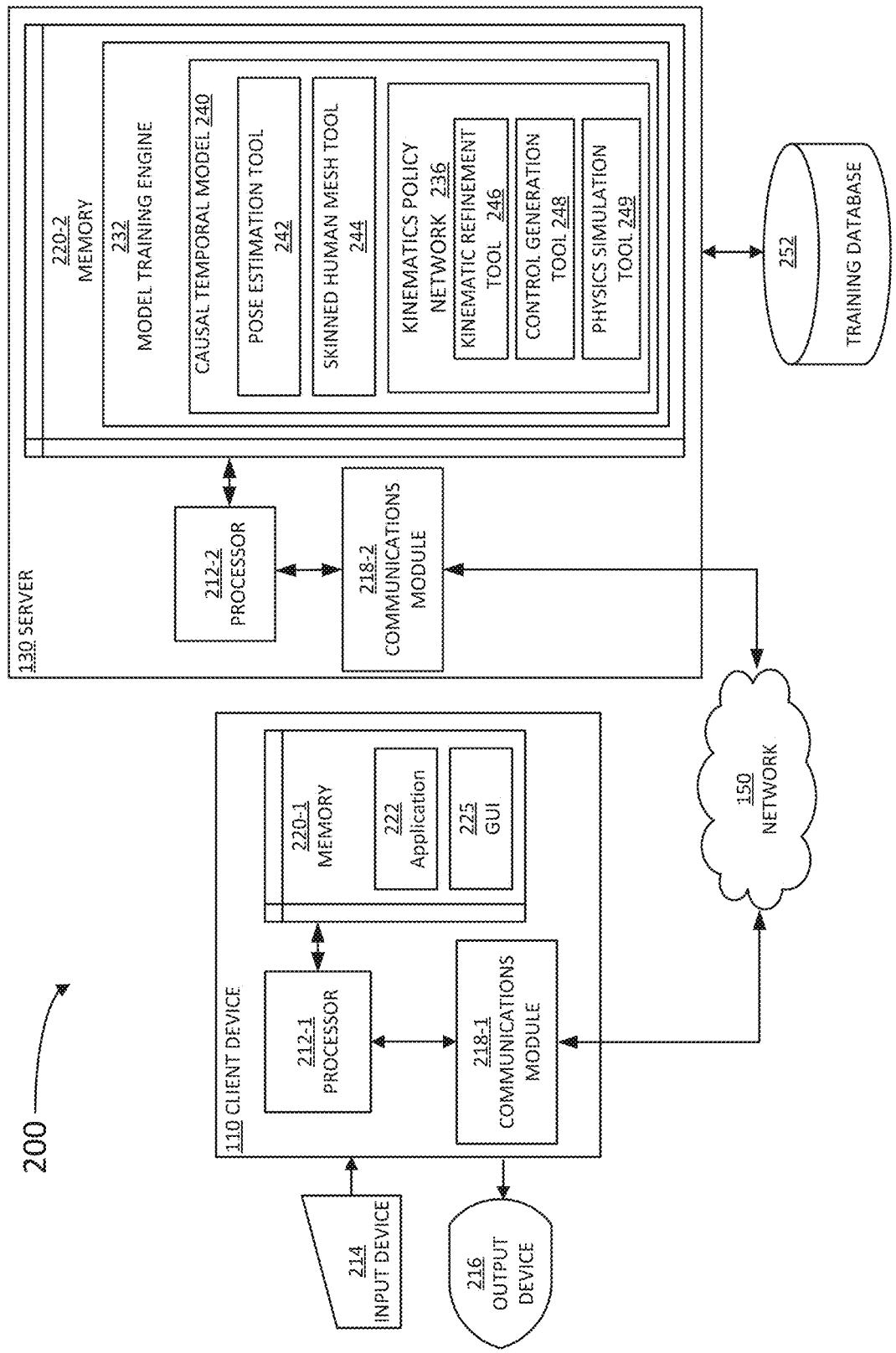
FIG. 2 is a block diagram illustrating an example server and client from the architecture of FIG. 1, according to certain aspects of the disclosure.

FIG. 2 is a block diagram 200 illustrating an example server 130 and client device 110 from architecture 100, according to certain aspects of the disclosure. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices via network 150. Communications modules 218 may include, for example, modems or Ethernet cards, and/or radio communication hardware and software. Client device 110 may be a desktop computer, a mobile computer (e.g., a laptop, a palm device, a tablet, or a smart phone), or an AR/VR headset configured to provide an immersive reality experience to a user.

A user may interact with client device 110 via an input device 214 and an output device 216. Input device 214 may include a mouse, a keyboard, a pointer, a joystick, a touchscreen, a microphone, a video camera, and the like. In some embodiments, input device 214 may include a back-facing camera to capture the face of a user of a VR/AR headset, or a portion thereof, including an eye. Accordingly, in some embodiments, input device 214 may include an eye tracking device to capture the movement of a user's pupil in an AR/VR headset. Output device 216 may be a screen display (e.g., a VR/AR display), a touchscreen, a speaker, and the like. Client device 110 may include a memory 220-1 and a processor 212-1. Memory 220-1 may include an application 222 and a GUI 225, configured to run in client device 110 and couple with input device 214 and output device 216. Application 222 may be downloaded by the user from server 130, and may be hosted by server 130.

Server 130 includes a memory 220-2, a processor 212-2, and communications module 218-2. Hereinafter, processors 212-1 and 212-2, and memories 220-1 and 220-2, will be collectively referred to, respectively, as "processors 212" and "memories 220." Processors 212 are configured to execute instructions stored in memories 220. In some embodiments, memory 220-2 includes a model training engine 232. Model training engine 232 may share or provide features and resources to GUI 225 and/or application 222, including multiple tools associated with training and using a three-dimensional avatar rendering model for immersive reality applications. The user may access model training engine 232 through GUI 225 installed in a memory 220-1 of client device 110. Application 222 may be installed by server 130 and perform scripts and other routines provided by server 130 through any one of multiple tools. Execution of GUI 225 may be controlled by processor 212-1. In some embodiments, GUI 225 includes an interactive display that reads inputs and outputs from a virtual joystick representing a real joystick handled by the user (input device 214).

Model training engine 232 may be configured to create, store, update, and maintain a real-time causal temporal model 240, as disclosed herein. Causal temporal model 240 may include encoders, decoders, and tools such as a pose estimation tool 242, and a skinned human mesh tool 244. Causal temporal model 240 may also include a kinematics policy network 236. Kinematics policy network 236 may include a kinematic refinement tool 246, a control generation tool 248, and a physics simulation tool 249. In some embodiments, model training engine 232 may access one or more machine learning models stored in a training database 252. Training database 252 includes training archives and other data files that may be used by model training engine 232 in the training of a machine learning model, according to the input of the user through GUI 225. Moreover, in some embodiments, at least one or more training archives or machine learning models may be stored in either one of memories 220, and the user of client device 110 may have access to them through GUI 225.

Pose estimation tool 242 determines a pose of the subject based on an input image, or multiple, multi-view input images. Pose estimation tool 242 integrates kinematic inference with reward/loss (RL)-based control. Pose estimation tool 242 runs in real-time, is compatible with physics simulation tool 249. Model training engine 232 includes a learning mechanism that aim to match the output motion to the ground truth in pose estimation tool 242. Pose estimation tool 242 can achieve accurate pose estimation by integrating images-based kinematic inference and RL-based control with a proposed policy design.

Skinned human mesh tool 244 provides a skeleton of "B" bones, a mesh of "V" vertices, and a skinning weight matrix, $W \in R^{V \times B}$. Each element $W_{ij}$ in matrix W specifies the influence of the j-th bone's transformation on the i-th vertex's position. Skinned human mesh tool 244 obtains a rigid vertex-to-bone association, $A \in R^V$, by assigning each vertex, i, to the bone with the largest skinning weight for it: $A_i = \text{argmax}_j W_{ij}$. With vertex-to-bone association, A, skinned human mesh tool 244 creates the geometry of each bone by computing the 3D convex hull of all the vertices assigned to the bone. Assuming constant density, skinned human mesh tool 244 determines the mass of each bone by the volume of its geometry. In some embodiments, skinned human mesh tool 244 is fully automatic, is compatible with different body mesh models (e.g., skinned multi-person linear model—SMPL—), and ensures proper body geometry and mass assignment.

Physics simulation tool 249 generate accurate and seemingly real human bodily motion based on basic physical laws of motion. The physical laws of motion may include dynamic relations between actions, forces and torques and different body parts, and geometric constraints thereof (e.g., no overlaps between two different solid segments, no "submersion" or "levitation" of a subject on the ground).

Model training engine 232 may include algorithms trained for the specific purposes of the engines and tools included therein. In some embodiments, model training engine 232 includes a reinforcement learning algorithm (e.g., proximal policy optimization—PPO—) to solve for an optimal policy in causal temporal model 240. The algorithms may include machine learning or artificial intelligence algorithms making use of any linear or non-linear algorithm, such as a neural network algorithm, or multivariate regression algorithm. In some embodiments, the machine learning model may include a neural network (NN), a convolutional neural network (CNN), a generative adversarial neural network (GAN), a deep reinforcement learning (DRL) algorithm, a deep recurrent neural network (DRNN), a classic machine learning algorithm such as random forest, k-nearest neighbor (KNN) algorithm, k-means clustering algorithms, or any combination thereof. More generally, the machine learning model may include any machine learning model involving a training step and an optimization step. In some embodiments, training database 252 may include a training archive to modify coefficients according to a desired outcome of the machine learning model. Accordingly, in some embodiments, model training engine 232 is configured to access training database 252 to retrieve documents and archives as inputs for the machine learning model. In some embodiments, model training engine 232, the tools contained therein, and at least part of training database 252 may be hosted in a different server that is accessible by server 130.

Figure 3:
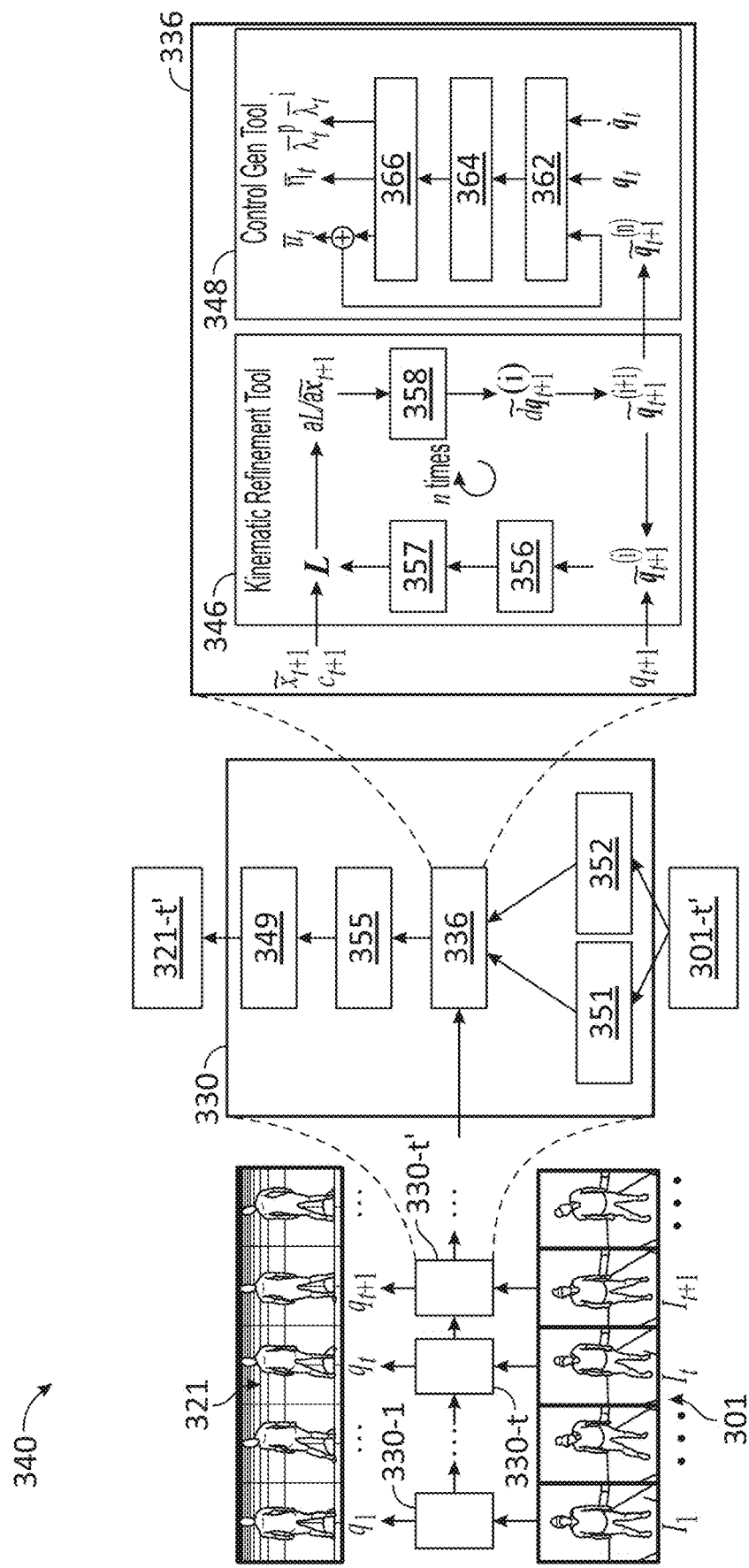
FIG. 3 illustrates a causal temporal model to simulate control of 3D human poses, according to some embodiments.

FIG. 3 illustrates a causal temporal model 340 to obtain solid body simulations 321 from human poses collected in input frames 301, according to some embodiments. Causal temporal model 340 collects multiple frames 301 from an input video sequence, and provides solid body simulations 321, a kinematics policy network 336, via a Markov decision process (MDP) including operations 330-1, through 330-$t$ and 330-$t'$ (hereinafter, collectively referred to as "MDP 330"). Each process in MDP 330 includes a key point detector 351 and a kinematic pose estimator 352 acting upon input frame 301-$t'$ to generate a body pose 321-$t'$ (e.g., $t'=t+1$), in a kinematics policy network 336 ($\mathcal{F}_{74}$).

MDP 330 includes a tuple M=(S, A, T, R, γ) of states (S), actions (A), transition dynamics (T), a reward function (R), and a discount factor (γ). MDP 330 includes a physics simulation tool 349 that models a conditional distribution, or "policy," π. Policy, $\pi(a_t, s_t)$, identifies an action, $a_t \in A$, given the current state, $s_t \in S$, of MDP 330. Starting from some initial state $s_1$, MSP 330 iteratively samples an action $a_t$ and physics simulation tool 349 generates the next state $S_t'$ with transition dynamics $T(s_t'|s_t, a_t)$ and gives a reward $r_t \in R$. In some embodiments, MDP 330 determines reward, $r_t$, based on how well the subject's pose simulations 321 align with the ground-truth subject motion from frames 301. A model training engine as disclosed herein teaches causal temporal model 340 an optimal policy that renders a high, or maximum value, for an expected return $J(\pi)=E_\pi(\Sigma_t \gamma^t \cdot r_t)$, which translates to imitating the ground-truth motion as closely as possible More specifically, state, $s_t \triangleq (q_t, \dot{q}_t, \tilde{q}_t', \check{x}_{t'}, c_{t'})$ includes the subject's current pose $q_t$, joint velocities (time derivative of the pose) $\dot{q}_t$, as well as the estimated kinematic pose, $\tilde{q}_{t'}$, key points, $\check{x}_{t'}$ and key point confidence, $c_{t'}$, of the next frame, at a future time $t'$ (e.g., $t+1$). State, $s_t$, includes information of both the current frame ($q_t, \dot{q}_t$) and a future frame ($\tilde{q}_{t'}, \check{x}_{t'}, c_{t'}$), so that causal temporal model 340 learns to transition from current pose $q_t$ to a desired next pose $\dot{q}_t$, e.g., pose close to the ground truth (e.g., frames 301).

Key point detector 351 identifies key points $\check{x}_i$ (e.g., bodily joints—knees, wrists, neck, heels, toes and the like, wherein the index, i, stands for as many key points found per frame) in the body of a subject in frame at a time, t, 301-$t$, and associates a confidence level, $c_i$, to each. Kinematic pose estimator 352 provides a corresponding "skeletal" pose and velocity $q_i, \dot{q}_i$, at time, t, respectively. The coordinates, $q_i$, are line segments indicating the start-end point of a stylized "bone" or limb, for as many bones, i, in a simplified human skeleton, at time, t (e.g., a segment for neck and head, a segment for the femur, a segment for the torso, and the like). A proportional derivative (PD) controller 355 provides torques, $\tau_i$, and actions, $a_i$, to a physics simulation tool 349. In some embodiments, it is desirable to run policy $\pi(a_t, s_t)$ at 30 Hz (e.g., the rate of input frames 301), while physics simulation tool 349 runs at 450 Hz, to ensure stability and convergence of MDP 330. Accordingly, in some embodiments a single policy step is updated after about fifteen (15) cycles of physics simulation tool 349. In some embodiments, action $a_t$, directly outputs torques, tip, to be applied at each joint (except the root), which are used repeatedly by physics simulation tool 349 during the 15 simulation steps. In some embodiments, a finer control can be achieved by adjusting the at each step, based on state, $s_t$. Thus, in some embodiments, PD controller 355 generates torques, $\tau_i$, at each non-root joint. In some embodiments, PD controller 355 includes target joint angles, $u_t$, in the definition of actions, $a_t$. For example, at the j-th cycle of the 15 simulation steps, PD controller 355 determines torques, $t_i$, with the following expression:

$$\tau_t = k_p^\circ (u_t - q_t^{nr}) - k_d^\circ \dot{q}_t^{nr} \tag{1}$$

where $k_p$ and $k_d$ are parameters provided by PD controller 355, $q_t^{nr}$ and $\dot{q}_t^{nr}$ denote the joint angles and velocities of non-root joints at the start of the simulation step, respectively, and "$\circ$", denotes element-wise multiplication. In some embodiments, PD controller 355 acts like damped springs that drive joints to target angles $u_t$, where $k_p$ and $k_d$ are the stiffness and damping factor of the springs. In some embodiments, PD controller 355 allows $k_p$ and $k_d$ to be dynamically adjusted by policy, $\pi(a_t, s_t)$, to achieve an even finer level of character control. Accordingly, physics simulation tool 349 may include elements $\lambda_p^p$ and $\lambda_t^d$ into action $a_t$, for adjusting $k_p$ and $k_d$, respectively, and allow policy, $\pi(a_t, s_t)$ to include residual forces and torques, $\tau_i$. Accordingly, action, $a_t$, may be defined as $a_t \triangleq (u_t, \eta_t, \lambda_t^p, \lambda_t^d)$.

In some embodiments, MDP 330 includes a reward function, R, that encourages the motion $q_t$ generated by policy, $\pi(a_t, s_t)$, to match the ground-truth motion $\hat{q}_t$ (cf. input frames 301). A reward, $r_t$, at each time step may be defined as the multiplication of four sub-rewards:

$$r_t = r_t^p \cdot r_t^v \cdot r_t^j \cdot r_t^k \tag{2}$$

Wherein a pose reward $r_t^p$ measures the difference between the local joint orientations $o_t^j$ and the ground truth $\hat{o}_t^j$:

$$r_t^p = \exp\left[-\alpha_p \cdot \left(\sum_{j=1}^{J} \|\sigma_t^j \ominus \hat{\sigma}_t^j\|^2\right)\right] \tag{3}$$

where J is the total number of joints for the subject, $\ominus$ denotes the relative rotation between two rotations, and $\|\cdot\|$ computes the rotation angle. Velocity reward, $r_t^v$ measures a mismatch between predicted joint velocities $\dot{q}_t$ and ground truth velocities $\hat{\dot{q}}_t$:

$$r_t^v = \exp[-\alpha_v \cdot (\|\dot{q}_t - \hat{\dot{q}}_t\|^2)] \tag{4}$$

Joint position reward $r_t^j$ encourages predicted joint positions $X_t^j$ to match the ground truth $\hat{X}_t^j$:

$$r_t^j = \exp\left[-\alpha_j \cdot \left(\sum_{j=1}^{J} \|X_t^j - \hat{X}_t^j\|^2\right)\right] \tag{5}$$

Key point reward $r_t^k$ pushes a 2D image projection $x_t^j$ of the joints in body simulation 321 to match the ground truth $\hat{x}_t^j$:

$$r_t^k = \exp\left[-\alpha_k \cdot \left(\sum_{j=1}^{J} \|x_t^j - \hat{x}_t^j\|^2\right)\right] \tag{6}$$

In some embodiments, orientations $o_t^j$, predicted 3D joint positions, $X_t^j$, and 2D image projections, $x_t^j$, are functions of predicted pose $q_t$. In some embodiments, predicted joint velocities $\dot{q}_t$ are computed via finite difference.

Weighting factors $\alpha_p$, $\alpha_v$, $\alpha_j$, and ak inside each reward (cf. Eqs. 3-6). These sub-rewards complement each other by matching different features of the generated motion to the ground-truth: joint angles, velocities, as well as 3D and 2D joint positions. In some embodiments, reward, R, is multiplicative (cf. Eq. 2) which eases policy learning. This also may ensure that none of the factors (cf. Eqs. 3-6) can be overlooked, to achieve a high reward.

$F_\theta$ 336 may include a parametrized Gaussian policy $\pi(a_t, s_t)=N(\bar{a}_t, \Sigma)$ where a mean $\bar{a}_t \triangleq (\bar{u}_t, \bar{\eta} T_t, \bar{\lambda}_t^p, \bar{\lambda}_t^d)$ is based on parameters $\theta$, and is a fixed diagonal covariance matrix whose elements are treated as "hyperparameters." Noise in the Gaussian policy $N(\bar{a}_t, \Sigma)$ allows the MDP 330 to explore different actions around the mean action at and use these explorations to improve the policy during training of causal temporal model 240. During a test time, noise may be removed and causal temporal model 340 takes mean action, $\bar{a}_t$, to improve performance.

Based on the configuration of state, $s_t$, $\bar{a}_t$ can be written in terms of $F_\theta$ 336 as:

$$\bar{a}_t = \mathcal{F}_\theta(q_t, \dot{q}_t, \tilde{q}_{t'}, \check{x}_{t'}, c_{t'}) \quad (7)$$

In some embodiments, $\tilde{q}_{t'}$, is the predicted kinematic pose, $\check{x}_{t'}$, and $c_{t'}$, are the detected keypoints and their confidence, respectively, and all parameters are linked a future (e.g., next) frame, at time t'. The components $(\bar{u}_t, \bar{\eta}_t, \bar{\lambda}_t^p, \bar{\lambda}_t^d)$ of mean action, $\bar{a}_t$, may be determined with the following mathematical expressions:

$$\tilde{q}_{t'}^{(n)} = \mathfrak{R}_\theta(\tilde{q}_{t'}, \check{x}_{t'}, c_{t'}) \quad (8)$$

$$\delta\bar{u}_t, \bar{\eta}_t, \bar{\lambda}_t^p, \bar{\lambda}_t^d)=g_\theta(\tilde{q}_{t'}^{(n)}, q_t, \dot{q}_t) \quad (9)$$

$$\bar{u}_t=\tilde{q}_{t'}^{(n)}+\delta\bar{u}_t \quad (10)$$

In Eq. (8), $\mathfrak{R}_\theta$ is a kinematic refinement unit that iteratively refines the kinematic pose $\tilde{q}_{t'}$ using keypoints $\check{x}_{t'}$ and confidence $c_{t'}$, and $\tilde{q}_{t'}^{(n)}$ is the refined pose after n iterations of $\mathfrak{R}_\theta$. Eqs. (9) and (10) describe a control generation tool 348 ($g_\theta$), that maps the refined pose $\tilde{q}_{t'}^{(n)}$, current pose, $q_t$, and velocities, $\dot{q}_t$, to the components of the mean action at. Specifically, control generation tool 348 includes a feature extraction layer 362, a normalization layer 364 (based on running estimates of mean and variance) and an MLP 366 ($V_\theta$). Eq. (10), defines a residual connection that produces the mean PD controller target angles $\bar{u}_t$ using the refined kinematic pose $\tilde{q}_{t'}^{(n)}$. Eq. (10) builds a proper inductive bias, because $\tilde{q}_{t'}^{(n)}$, is a good guess for predicting a future pose, $q_{t'}$, and thus a good base value for $\bar{u}_t$. In some embodiments, angles $u_t$ do not translate to the same next pose $q_{t'}$, of the subject, e.g., $q_{t'} \ne u_t$. For example, under gravity and contact forces, joint angles $q_{t'}$ may not be $u_t$ when PD controller 355 reaches equilibrium. In some embodiments, where PD controller 355 acts like a spring, it may reach a different equilibrium positions based on external forces on the subject. Nonetheless, next pose $q_{t'}$, generally will not be far away from $u_t$. Learning the residual $\delta u_t$ (cf. Eq. 10) may be easier than learning the new value from scratch. This design also synergizes the kinematics of the character with its dynamics as the kinematic pose $\tilde{q}_{t'}^{(n)}$ may be tightly coupled with the input of PD controller 355 in physics simulation tool 349.

Kinematic refinement tool 346 includes a multilayer perceptron (MLP) 358 that maps a feature vector, z, to a pose update, $\tilde{q}_{t'}^{i+1}$, where i denotes the i-th refinement iteration:

$$\delta\tilde{q}_{t'}^i=U_\theta(z) \quad (11)$$

$$\tilde{q}_{t'}^{i+1}=\tilde{q}_{t'}^i+\delta\tilde{q}t^k \quad (12)$$

Wherein $\tilde{q}_{t'}^0=\tilde{q}_{t'}$.

Kinematic refinement tool 346 receives kinematics pose at time, t, $q_t^t$, as initial value, and combines this with an updated pose value at a time, t', $q_{t'}^{i+1}$, in a forward kinematics module 356. Forward kinematics module 356 generates a set of three-dimensional (3D) joints 357, $\tilde{X}_{t'}$. 3D joints 357 include a camera projection which, combined with key points, $\check{x}_t$, and confidence levels, $c_t$, form a loss operator, L, defined as:

$$\mathcal{L}(\tilde{X}_{t'}) = \sum_{j=1}^{J} \left\| \Pi(\tilde{X}_{t'}^j) - \check{x}_{t'}^j \right\|^2 \cdot c_{t'}^j \quad (13)$$

Where $\Pi(\blacksquare)$ denotes a perspective camera projection. Kinematic refinement tool 346 also determines a gradient feature, $z \triangleq \partial \mathcal{L} /\partial \tilde{X}_{t'}^j$, which indicates how to adjust kinematic pose $\tilde{q}_{t'}^{(i)}$ to match key points $\check{x}_{t'}^j$ collected from input video frames 301. In some embodiments, gradient feature, z, may be an informative kinematic feature to learn a pose update that eventually results in stable and accurate control of the subject.

Gradient feature, z, also accounts for key point uncertainty by weighting the loss with the key point confidence $c_{t'}^j$, (cf. Eq. 13). In some embodiments, z is converted to the subject's root coordinate frame to be invariant of the subject's orientation. MLP 358 uses gradient feature, z, to update a kinematic pose of the subject, producing a dynamics-based control of body simulations 321. Thus, kinematic refinement tool 346 and control generation tool 348 ensure accurate and physically-plausible pose estimation of body simulations 321.

Figure 4A:
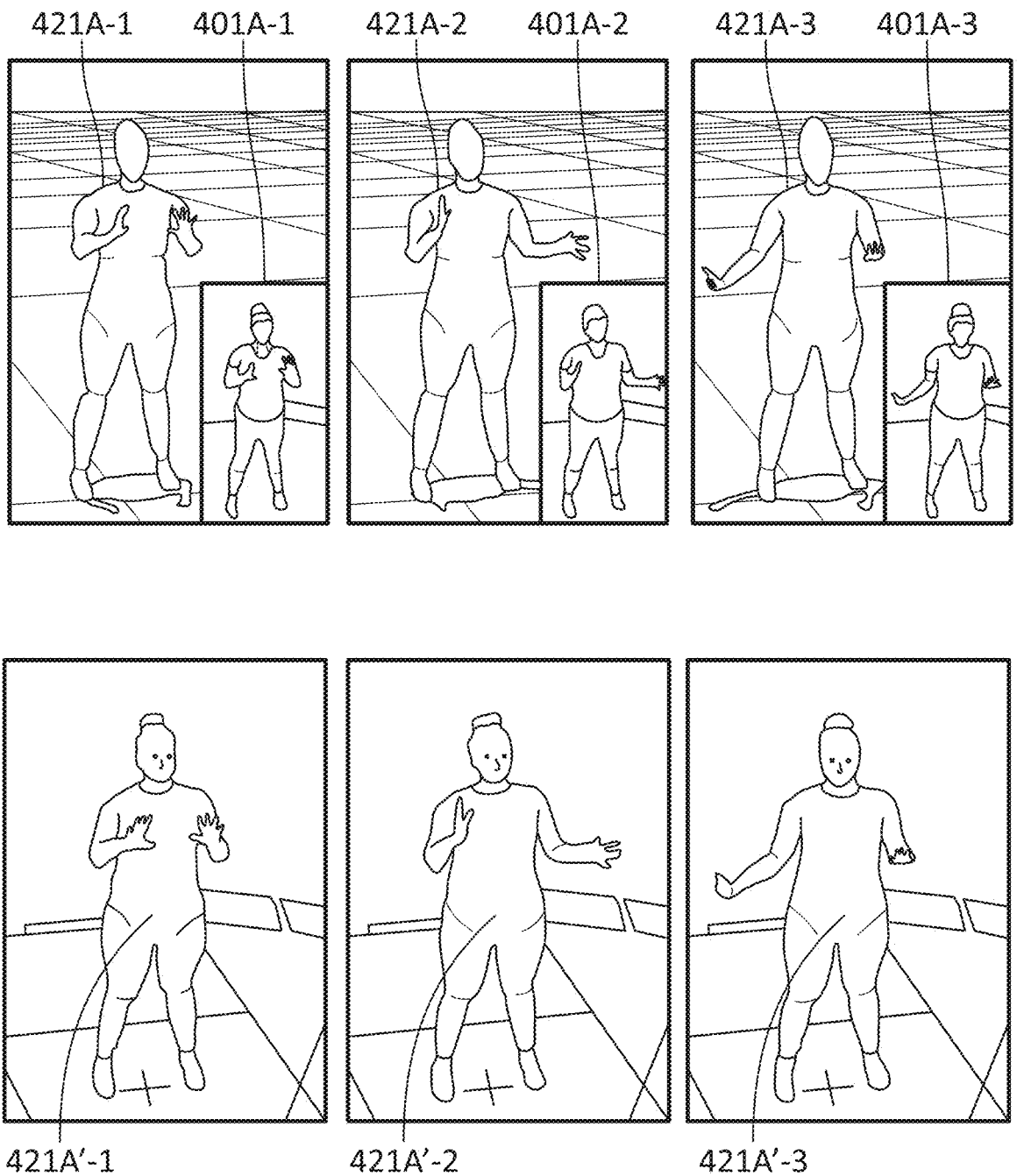
FIGS. 4A-4B illustrate solid body simulations obtained with a physics simulator and a physically-plausible human motion, according to some embodiments.
Figure 4B:
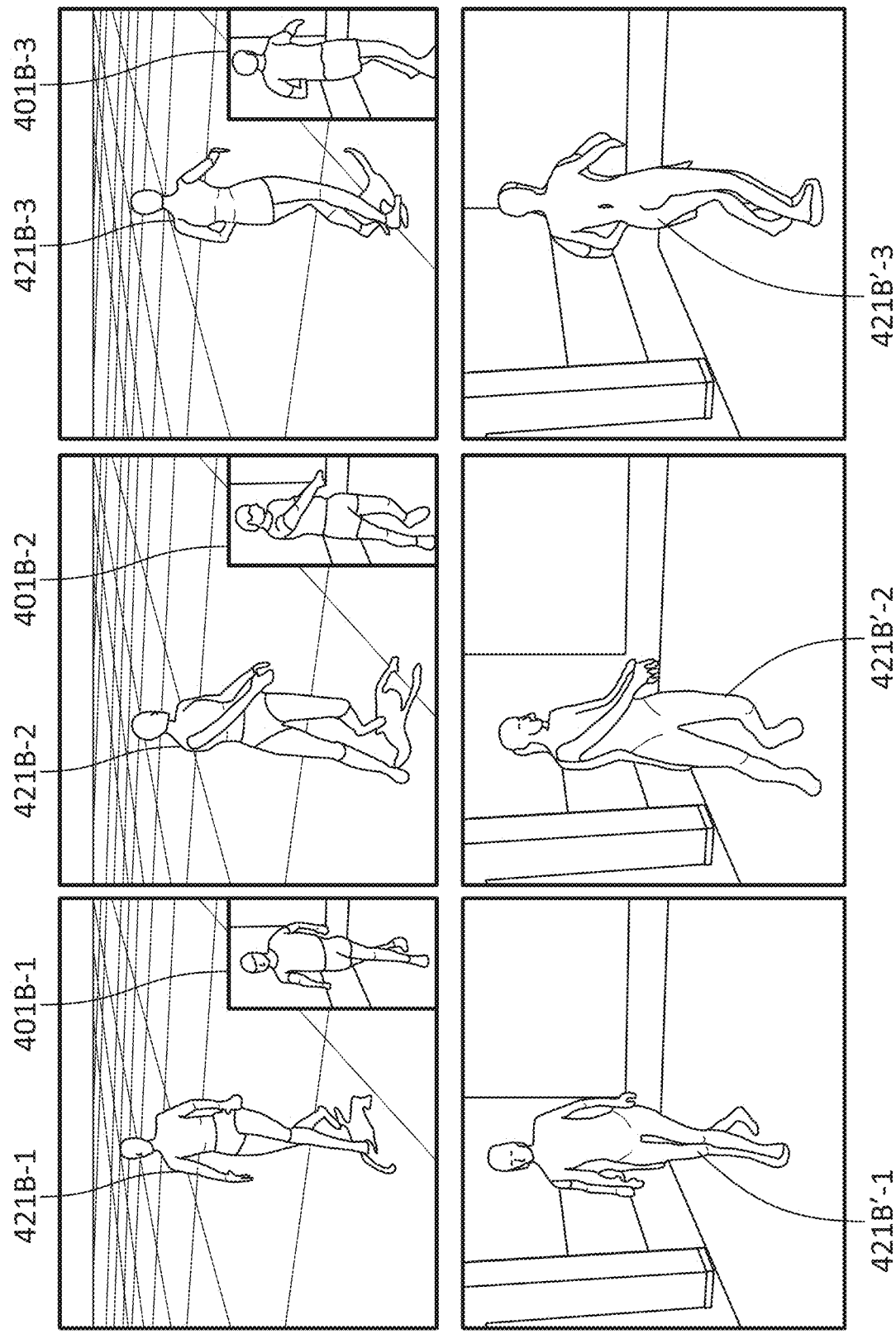

FIGS. 4A-4B illustrate solid body simulations 421A-1, 421A-2, 421A-3, 421A'-1, 421A'-2 and 421A'-3, 421B-1, 421B-2, 421B-3, 421B'-1, 421B'-2 and 421B'-3 (hereinafter, collectively referred to as "solid body simulations 421A, 421B, and 421"), obtained with a physics simulator and a physically-plausible human motion, according to some embodiments. Solid body simulations 421A were obtained from input frames 401A-1, 401A-2 and 401A-3 (hereinafter, collectively referred to as "input frames 401A"). Solid body simulations 421B were obtained from input frames 401B-1, 401B-2 and 401B-3 (hereinafter, collectively referred to as "input frames 401B"). Input frames 401A and 401B, for different subjects (A and B), will be collectively referred to, hereinafter, as "input frames 401."

Each of the FIGS. 1, 2 and 3 correspond to different moments in time (e.g., different poses and body postures) for a video streaming of the subject from input frames 401. The different solid body representations in A, and B indicate a segmented body representation (A) or a physically-plausible representation (B).

Figure 5A:
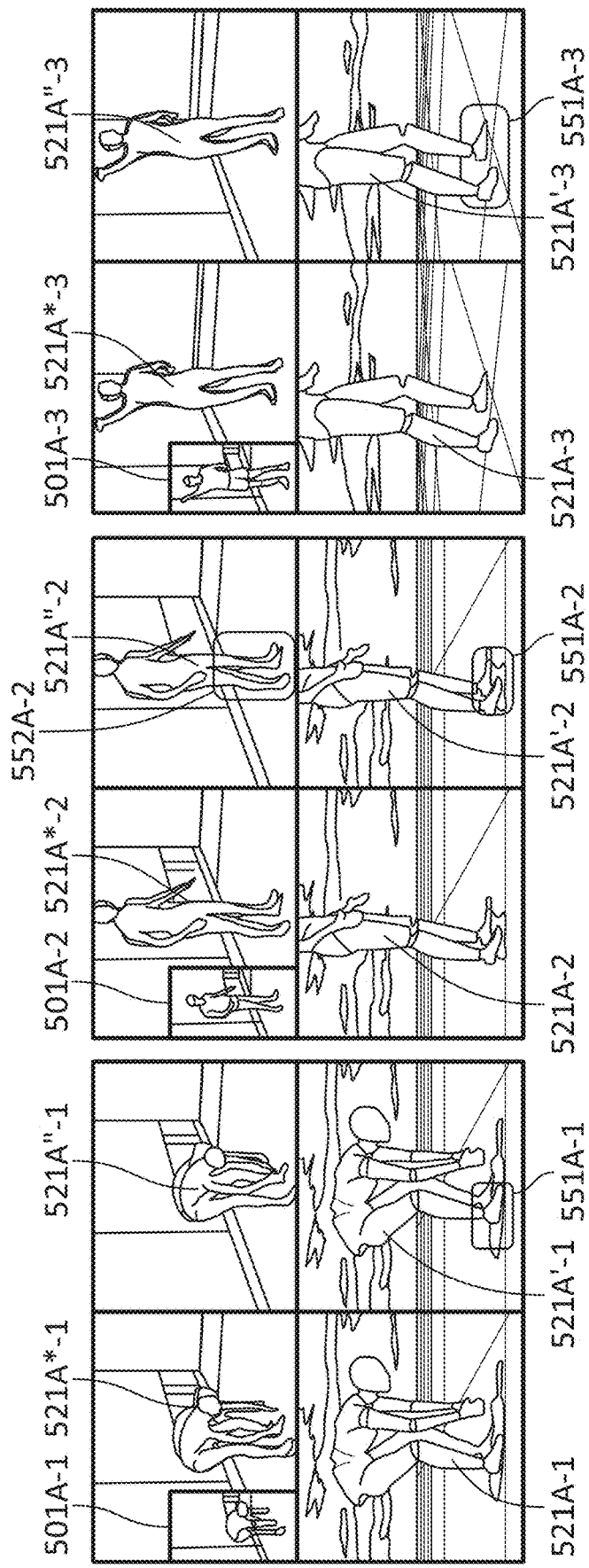
FIGS. 5A-5B illustrate different views of solid body simulations obtained with a causal temporal model, according to some embodiments.
Figure 5B:
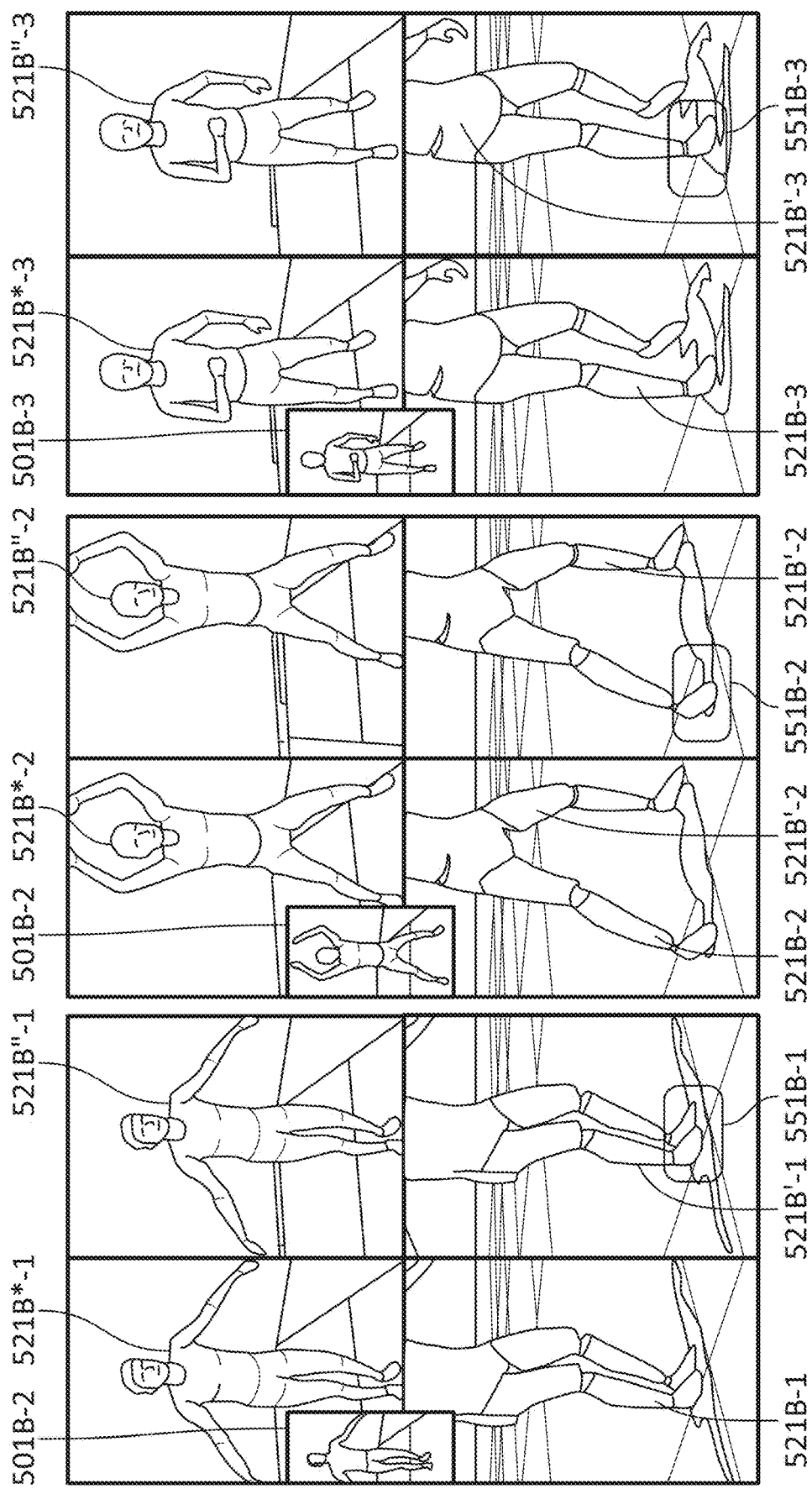

FIGS. 5A-5B illustrate different views of solid body simulations 521A-1, 521A-2, 521A-3, 521A*-1, 521A*-2, 521A*-3, 521B-1, 521B-2, 521B-3, 521B*-1, 521B*-2, and 521B*-3 (hereinafter, collectively referred to as causal model simulations 521A, 521B, and 521), obtained with a causal temporal model, and solid body simulations 521A'-1, 521A'-2, 521A'-3, 521A"-1, 521A"-2, 521A"-3, 521B'-1, 521B'-2, 521B'-3, 521B"-1, 521B"-2, 521B"-3 (hereinafter, collectively referred to as kinematic model simulations 521A', 521B' and 521') obtained with a kinematic model, according to some embodiments. Causal model simulations 521' and kinematic model simulations 521' are obtained from the same input image frames 501A-1, 501A-2, 501A-3, 501B-1, 501B-2 and 501B-3 (hereinafter, collectively referred to as "input frames 501"), respectively.

Artifacts 551A-1, 551A-2, 551A-3, 551B-1, 551B-2, and 551B-3 (hereinafter, collectively referred to as "artifacts 551A, 551B and 551") and 552A-2 in kinematic model simulations 521' indicate the convenience of using a causal temporal model based on actions and action policies to determine a torque field that induces the subject body to move and adopt different poses and postures. Additionally, including physical constraints avoids obvious artifacts such as partial subject immersion in the ground (cf. artifacts 551A-3 and 551B-3).

To determine the contribution of each proposed component of a causal temporal model as disclosed herein, features are removed one by one to investigate performance results. Table 2 summarizes results where different variants of the causal temporal model as disclosed herein are used (cf. causal temporal model 240) by removing a single component each time (e.g., ablation process). A meta-PD control and the kinematic refinement tool (cf. PD controller 355 and kinematic refinement tools 246 and 346) contributes to better pose accuracy as indicated by the corresponding ablations (w/o Meta-PD and w/o Refine). In some embodiments, ablation (w/o ResAngle) shows that it is desirable to have the residual connection in the policy network for producing the mean PD controller target angles $u_t$ (cf. kinematics aware policy network 336). The residual forces (cf. lit) in action, $a_t$, are desirable to avoid a performance drop of the variant (w/o ResForce). Without the residual forces, the policy is not robust and the character often falls down as indicated by the large acceleration error (Accel). A feature extraction layer in the policy is also desirable to extracts informative features of both the current frame and next frame to learn control that advances the character to the next pose. Table 1

VR/AR headset, or a model training engine including a causal temporal model (e.g., application 222, model training engine 232, and causal temporal model 240). A user may interact with the application in the client device via input and output elements and a GUI, as disclosed herein (cf. input device 214, output device 216, and GUI 225). The causal temporal model may include a pose estimation tool, a skinned human mesh tool, and a kinematics policy network, as disclosed herein (e.g., pose estimation tool 242, skinned human mesh tool 244, and kinematics policy network 236). The kinematics policy network may include a kinematic refinement tool, a control generation tool, and a physics simulation tool, as disclosed herein (e.g., kinematic refinement tool 246, control generation tool 248, and physics simulation tool 249). In some embodiments, methods consistent with the present disclosure may include at least one or more steps in method 700 performed in a different order, simultaneously, quasi-simultaneously, or overlapping in time.

Step 702 includes retrieving a first frame that includes a body image of a subject. In some embodiments, step 702 includes forming the first frame with the dynamic model of the subject.

Step 704 includes selecting, from the first frame, multiple key points within the body image of the subject that define a hull of a body part and multiple joint points that define a joint between two body parts.

Step 706 includes identifying a geometry, a speed, and a mass of the body part to include in a dynamic model of the subject, based on the key points and the joint points. In some embodiments, step 706 includes determining an action that causes the subject to move based on the geometry, the speed, and the mass of the body part.

Step 708 includes determining, based on the dynamic model of the subject, a pose of the subject in a second frame after the first frame in a video stream. In some embodiments, step 708 includes determining a gradient factor to associate, the pose of the subject with a transition dynamics rule, based

| Method | Human3.6M | | | | | In-House Motion Dataset | | | | |
|---|---|---|---|---|---|---|---|---|---|---|
| | MPJPE ↓ | PA-PMJPE ↓ | Accel ↓ | FS ↓ | GP ↓ | MPJPE ↓ | PA-MPJPE ↓ | Accel ↓ | FS ↓ | GP ↓ |
| w/o Meta-PD | 59.9 | 44.7 | 5.9 | 2.2 | 1.4 | 39.8 | 31.7 | 7.1 | 0.4 | 0.1 |
| w/o Refine | 61.2 | 43.5 | 8.0 | 3.4 | 2.0 | 47.9 | 38.9 | 9.6 | 0.6 | 0.1 |
| w/o ResAngle | 68.7 | 51.0 | 6.4 | 4.1 | 2.1 | 193.4 | 147.6 | 6.5 | 0.9 | 0.3 |
| w/o ResForce | 115.2 | 65.1 | 23.5 | 6.1 | 3.2 | 48.4 | 31.3 | 12.5 | 0.9 | 0.3 |
| w/o FeatLayer | 81.4 | 47.6 | 9.3 | 5.0 | 1.8 | 36.9 | 27.5 | 9.5 | 0.6 | 0.1 |
| SimPoE (Ours) | 56.7 | 41.6 | 6.7 | 3.4 | 1.6 | 26.6 | 21.2 | 8.4 | 0.5 | 0.1 |

We also perform ablations to investigate how the number of refinement iterations in the policy affects pose accuracy, as follows.

Figure 6:
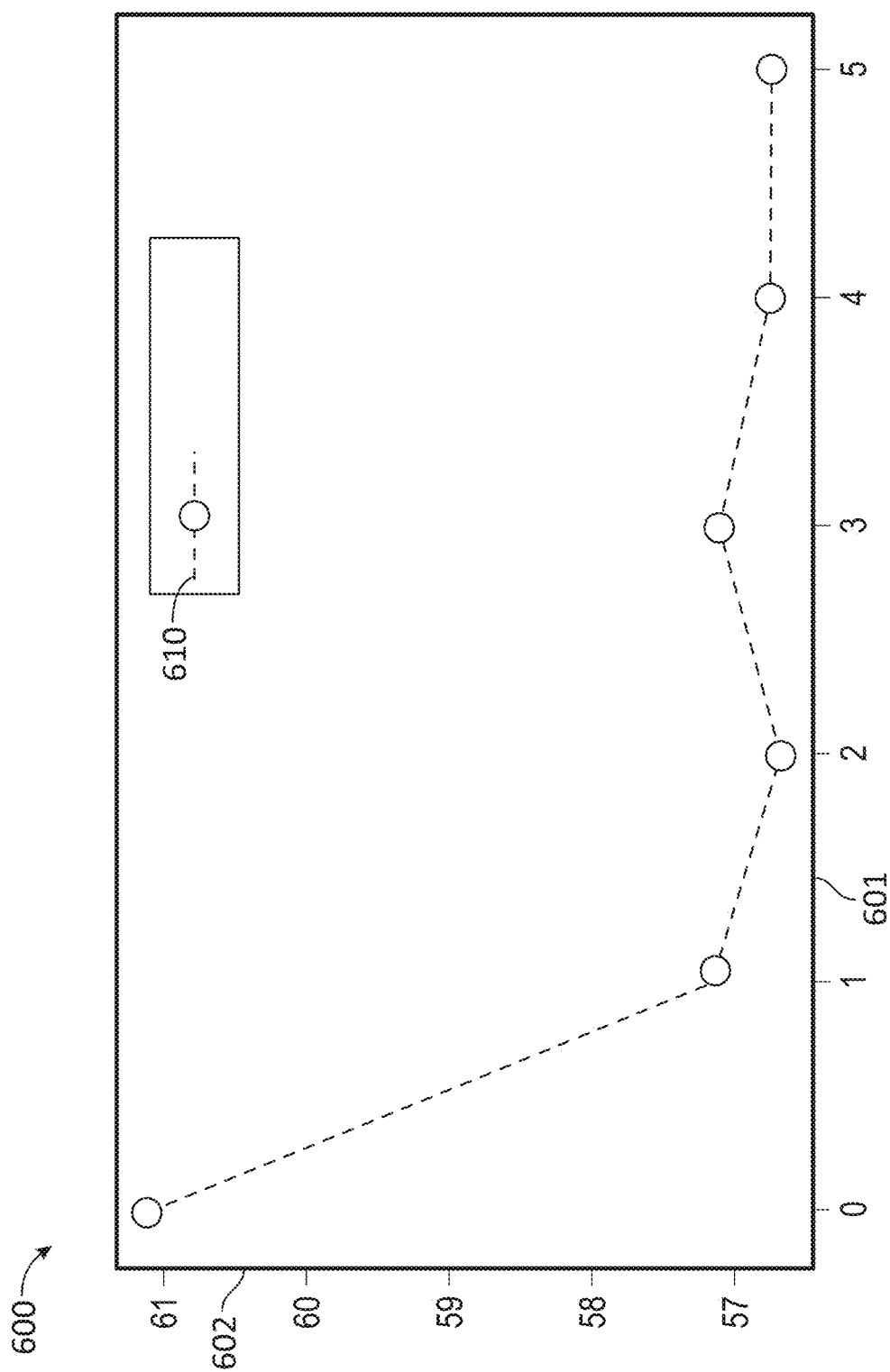
FIG. 6 illustrates a performance gain curve as a function of number of iterations in a causal temporal model, according to some embodiments.

FIG. 6 illustrates a chart 600 with a performance gain curve 610 as a function of number of iterations 601 in a causal temporal model, according to some embodiments. The performance gain 602 saturates around 5 refinement iterations of the model (n=5, cf. FIG. 3).

Figure 7:
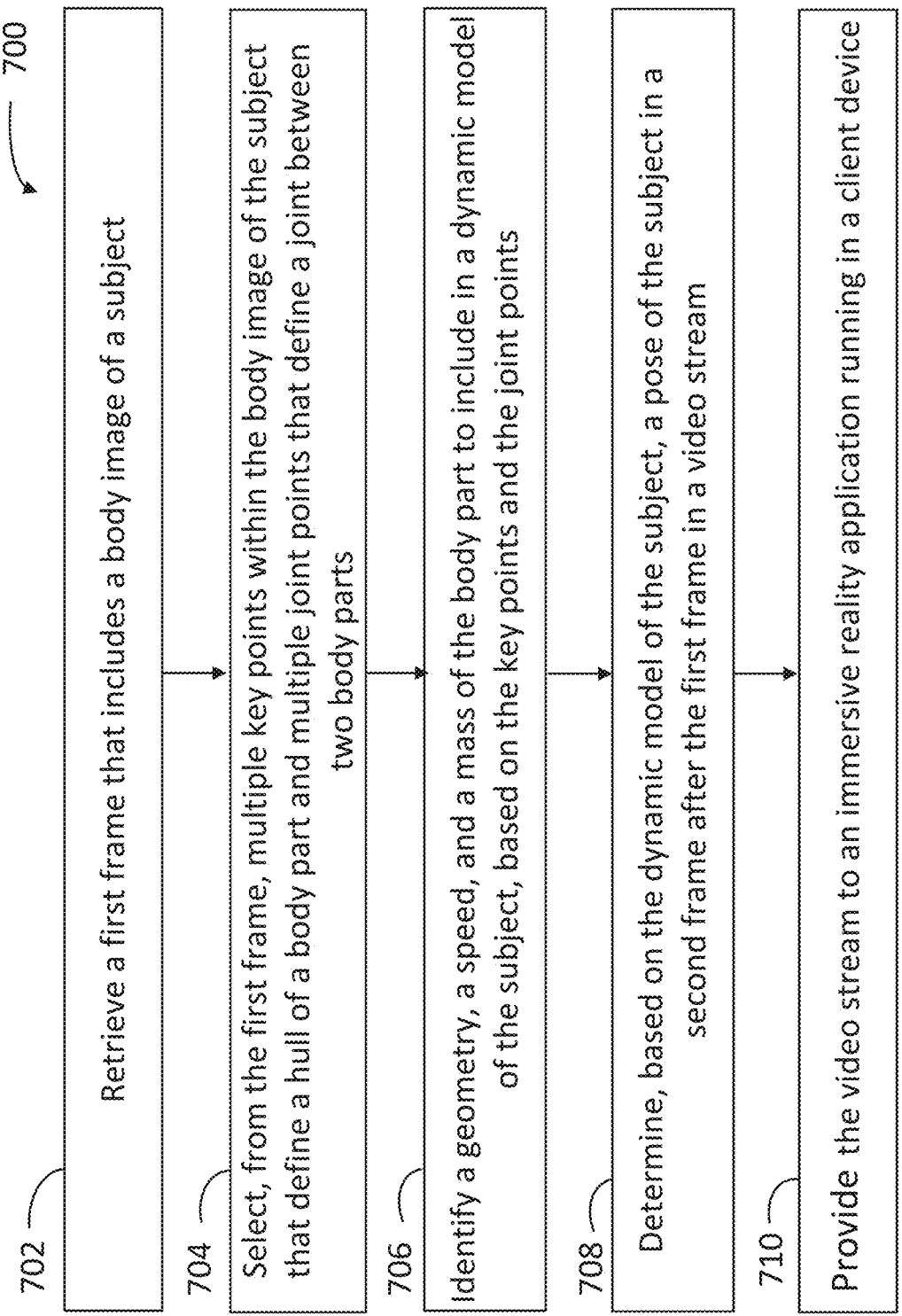
FIG. 7 illustrates a flowchart with steps in a method to form a three-dimensional model of a subject adopting a simulated human pose, according to some embodiments.

FIG. 7 illustrates a flowchart with steps in a method 700 to form a three-dimensional model of a subject adopting a simulated human pose, according to some embodiments. In some embodiments, method 700 may be performed at least partially by a processor executing instructions in a client device or server as disclosed herein (cf. processors 212 and memories 220, client devices 110, and servers 130). In some embodiments, at least one or more of the steps in method 700 may be performed by an application installed in a on a previous pose of the subject, a previous action feature, and an action policy in the dynamic model of the subject. In some embodiments, step 708 includes associating a torque field acting on each of the joint points based on the geometry, the speed, and the mass of the body part. In some embodiments, step 708 includes determining a gradient factor to obtain a position for each joint point and each key point in the pose of the subject, based on an action and an action policy in the dynamic model of the subject.

Step 710 providing the video stream to an immersive reality application running on a client device.

Figure 8:
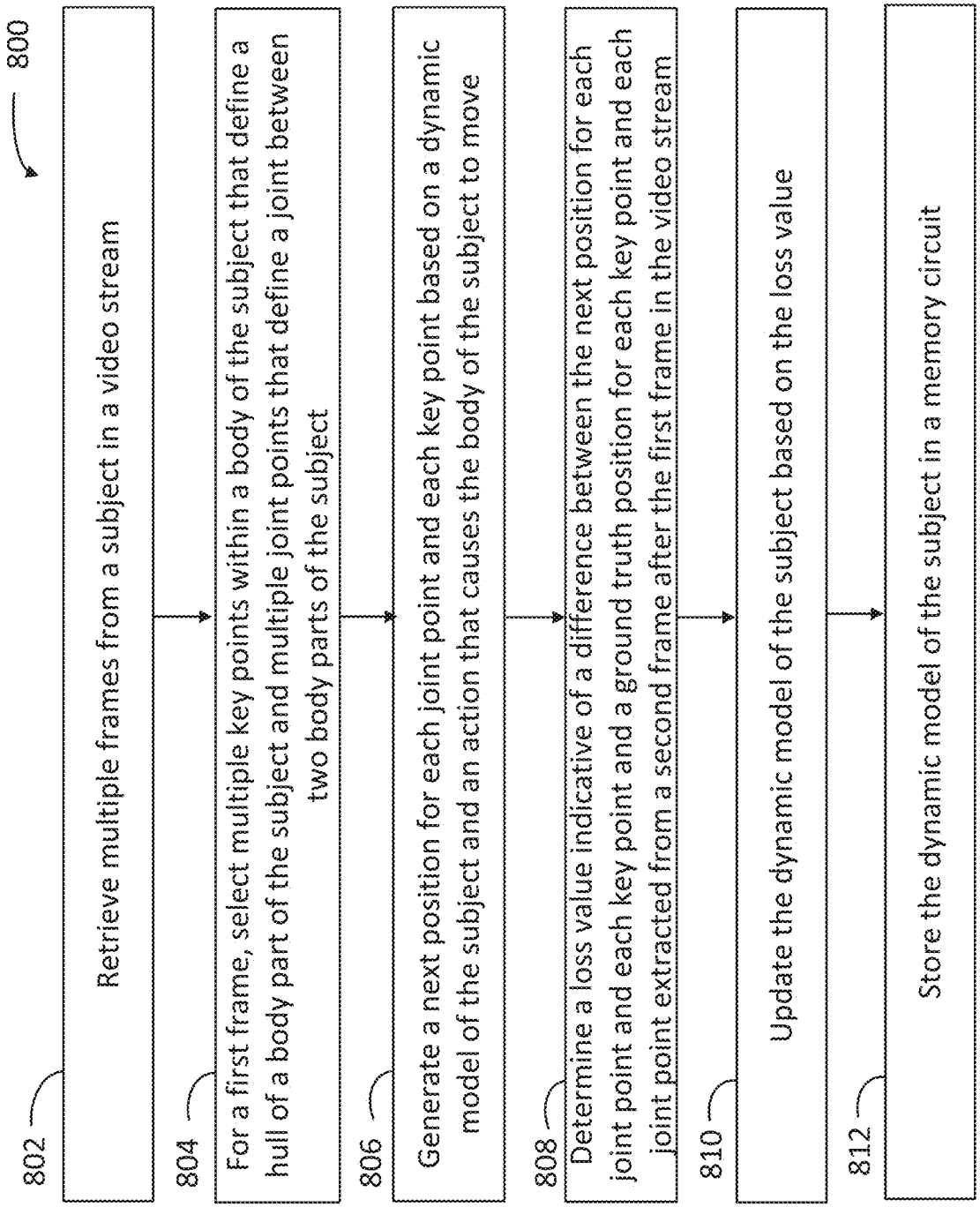
FIG. 8 illustrates a flowchart with steps in a method for training a three-dimensional model of a subject adopting a simulated human pose, according to some embodiments.

FIG. 8 illustrates a flowchart with steps in a method 800 for training a three-dimensional model of a subject adopting a simulated human pose, according to some embodiments In some embodiments, method 800 may be performed at least partially by a processor executing instructions in a client device or server as disclosed herein (cf. processors 212 and memories 220, client devices 110, and servers 130). In some embodiments, at least one or more of the steps in method 800 may be performed by an application installed in a VR/AR headset, or a model training engine including a causal temporal model (e.g., application 222, model training engine 232, and causal temporal model 240). A user may interact with the application in the client device via input and output elements and a GUI, as disclosed herein (cf. input device 214, output device 216, and GUI 225). The causal temporal model may include a pose estimation tool, a skinned human mesh tool, and a kinematics policy network, as disclosed herein (e.g., pose estimation tool 242, skinned human mesh tool 244, and kinematics policy network 236). The kinematics policy network may include a kinematic refinement tool, a control generation tool, and a physics simulation tool, as disclosed herein (e.g., kinematic refinement tool 246, control generation tool 248, and physics simulation tool 249). In some embodiments, methods consistent with the present disclosure may include at least one or more steps in method 800 performed in a different order, simultaneously, quasi-simultaneously, or overlapping in time.

Step 802 includes retrieving multiple frames from a subject in a video stream.

Step 804 includes for a first frame, selecting multiple key points within a body of the subject that define a hull of a body part and multiple joint points that define a joint between two body parts. In some embodiments, step 804 includes determining a confidence level for the multiple key points; and determining a loss value comprises factoring the confidence level for each of the key points in the loss value.

Step 806 includes generating a next position for each joint point and each key point based on a dynamic model of the subject and an action that causes the subject to move. In some embodiments, step 806 includes defining a kinematics policy based on a Gaussian distribution for features around mean values, and updating the dynamic model of the subject comprises using a covariance from the Gaussian distribution to update the dynamic model of the subject.

Step 808 includes determining a loss value indicative of a difference between the next position for each joint point and each key point and a ground truth position for each key point and each joint point extracted from a second frame after the first frame in the video stream.

Step 810 includes updating the dynamic model of the subject based on the loss value. In some embodiments, step 810 includes adding a residual force and torque to the action that causes the subject to move. In some embodiments, step 810 includes adjusting an action policy in the dynamic model of the subject to increase a reward value based on an accuracy of a position, an orientation, and a speed of the body part.

Step 812 includes storing the dynamic model of the subject in a memory circuit. In some embodiments, step 812 includes providing the dynamic model of the subject to a client device for an immersive reality application. In some embodiments, step 812 includes adjusting an action policy in the dynamic model of the subject to increase a reward value based on an accuracy of a position, an orientation, and a speed of the body part.

Hardware Overview

Figure 9:
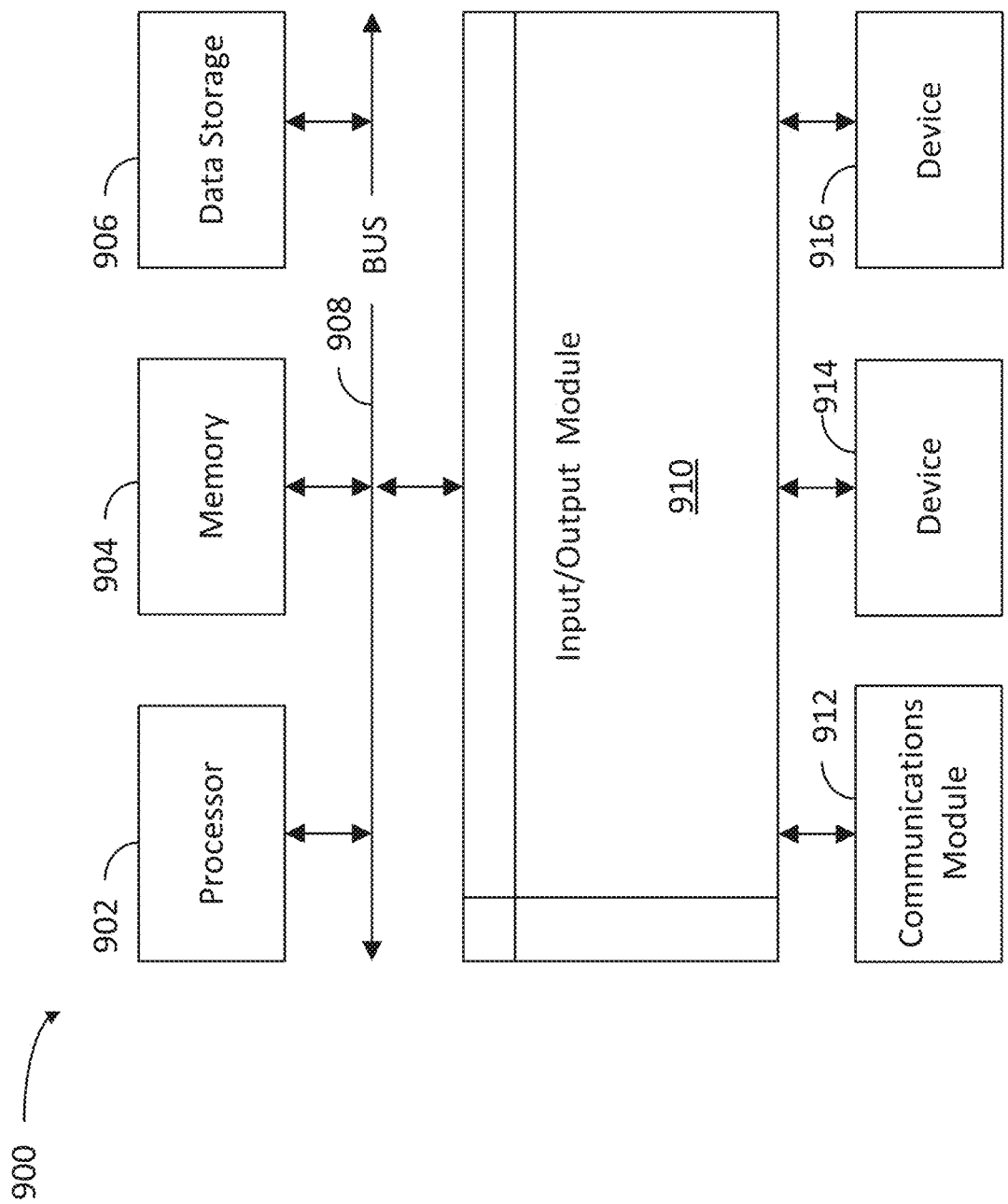
FIG. 9 is a block diagram illustrating an example computer system with which the client and server of FIGS. 1 and 2 and the methods of FIGS. 7-8 can be implemented.

FIG. 9 is a block diagram illustrating an exemplary computer system 900 with which the client and server of FIGS. 1 and 2, and the methods of FIGS. 7 and 8 can be implemented. In certain aspects, the computer system 900 may be implemented using hardware or a combination of software and hardware, either in a dedicated server, or integrated into another entity, or distributed across multiple entities. Computer system 900 (e.g., client 110 and server 130) includes a bus 908 or other communication mechanism for communicating information, and a processor 902 (e.g., processors 212) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, e.g., one or more modules of computer program instructions encoded on a computer-readable medium for execution by, or to control the operation of, the computer system 900, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. Input/output module 910 can be any input/output module. Exemplary input/output modules 910 include data ports such as USB ports. The input/output module 910 is configured to connect to a communications module 912. Exemplary communications modules 912 (e.g., communications modules 218) include networking interface cards, such as Ethernet cards and modems. In certain aspects, input/output module 910 is configured to connect to a plurality of devices, such as an input device 914 (e.g., input device 214) and/or an output device 916 (e.g., output device 216). Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 916 include display devices, such as an LCD (liquid crystal display) monitor, for displaying information to the user.

According to one aspect of the present disclosure, the client 110 and server 130 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires forming bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
    retrieving a first frame and a second frame after the first frame in a video stream that includes a body image of a subject;
    selecting, from the first and second frame, multiple key points within the body image of the subject that define a hull of a body part and multiple joint points that define a joint between two body parts;
    identifying a geometry of the body part based on the hull, a speed of the body part at a time corresponding to the first frame based on the first frame and the second frame, and a mass of the body part based on a volume of the geometry to include in a dynamic model of the subject, based on the key points and the joint points;
    determining, based on the dynamic model of the subject, a first pose of the subject in the second frame;
    identifying an action for the dynamic model of the subject based on the first pose and key points in the second frame;
    determining, based on the action, a second pose of the subject in the second frame; and
    providing the second pose based on the video stream to an immersive reality application running on a client device.

2. The computer-implemented method of claim 1, wherein retrieving a first frame from a subject comprises forming the first frame with the dynamic model of the subject.

3. The computer-implemented method of claim 1, further comprising determining a gradient factor to associate the pose of the subject with a transition dynamics rule, based on a previous pose of the subject, a previous action feature, and an action policy in the dynamic model of the subject.

4. The computer-implemented method of claim 1, wherein determining the pose of the subject comprises determining a gradient factor to obtain a position for each joint point and each key point in the pose of the subject, based on an action and an action policy in the dynamic model of the subject.

5. The computer-implemented method of claim 1, wherein determining the pose of the subject comprises associating a torque field acting on each of the joint points based on the geometry, the speed, and the mass of the body part.

6. The computer-implemented method of claim 1, further comprising determining an action that causes the subject to move based on the geometry, the speed, and the mass of the body part.

7. The computer-implemented method of claim 1, wherein determining a pose of the subject comprises identifying physical constraints for the body image of the subject relative to an environment, in the second frame.

8. The computer-implemented method of claim 1, wherein the dynamic model of the subject comprises a physics simulation tool to determine a state of the subject and an action policy tool that determines an action causally associated with the state of the subject, further comprising updating the physics simulation tool faster than the action policy tool.

9. The computer-implemented method of claim 1, wherein identifying a geometry, a speed, and a mass of the body part comprises correlating the key points and the joint points between the first frame and the second frame, based on a time elapsed between the first frame and the second frame in the video stream.

10. The computer-implemented method of claim 1, wherein providing the video stream to an immersive reality application comprises selecting a view point of the subject based on the immersive reality application.

11. A system, comprising:
    a memory storing multiple instructions; and one or more processors configured to execute the instructions to cause the system to perform operations, comprising:

retrieving a first frame and a second frame after the first frame in a video stream that includes a body image of a subject;

selecting, from the first frame, multiple key points within the body image of the subject that define a hull of a body part and multiple joint points that define a joint between two body parts;

identifying a geometry of the body part based on the hull, a speed of the body part at a time corresponding to the first frame based on the first frame and the second frame, and a mass of the body part based on a volume of the geometry to include in a dynamic model of the subject, based on the key points and the joint points;

determining, based on the dynamic model of the subject, a first pose of the subject in the second frame after the first frame in a video stream;

identifying an action for the dynamic model of the subject based on the first pose and key points in the second frame;

determining, based on the action, a second pose of the subject in the second frame; and providing the second pose based on the video stream to an immersive reality application running on a client device along a selected view point of the subject based on the immersive reality application.

12. The system of claim 11, wherein to retrieve a first frame from a subject the one or more processors execute instructions to form the first frame with the dynamic model of the subject.

13. The system of claim 11, wherein the one or more processors further execute instructions to determine a gradient factor to associate the pose of the subject with a transition dynamics rule, based on a previous pose of the subject, a previous action feature, and an action policy in the dynamic model of the subject.

14. The system of claim 11, wherein to determine the pose of the subject the one or more processors execute instructions to determine a gradient factor to obtain a position for each joint point and each key point in the pose of the subject, based on an action and an action policy in the dynamic model of the subject.

15. A computer-implemented method for training a model to simulate a solid body human pose, comprising:

retrieving multiple frames from a subject in a video stream;

for a first frame, selecting multiple key points within a body of the subject that define a hull of a body part and multiple joint points that define a joint between two body parts;

identifying a first position of the subject based on the key points and the joint points;

generating a next position for each joint point and each key point based on a dynamic model of the subject, the first position, and an action that causes the subject to move;

determining a loss value indicative of a difference between the next position for each joint point and each key point and a ground truth position for each key point and each joint point extracted from a second frame after the first frame in the video stream;

updating the dynamic model of the subject based on the loss value, wherein an updated next position is determined based on the updated dynamic model; and storing the dynamic model of the subject in a memory circuit.

16. The computer-implemented method of claim 15, further comprising determining a confidence level for the multiple key points; and determining a loss value comprises factoring the confidence level for each of the key points in the loss value.

17. The computer-implemented method of claim 15, further comprising providing the dynamic model of the subject to a client device for an immersive reality application.

18. The computer-implemented method of claim 15, wherein updating the dynamic model of the subject comprises adding a residual force and torque to the action that causes the subject to move.

19. The computer-implemented method of claim 15, further comprising defining a kinematics policy based on a Gaussian distribution for features around mean values, and updating the dynamic model of the subject comprises using a covariance from the Gaussian distribution to update the dynamic model of the subject.

20. The computer-implemented method of claim 15, wherein updating the dynamic model of the subject further comprises adjusting an action policy in the dynamic model of the subject to increase a reward value based on an accuracy of a position, an orientation, and a speed of the body part of the subject at a time corresponding to the first frame.

* * * * *